United States Patent
Narumi et al.

(10) Patent No.: US 10,505,336 B2
(45) Date of Patent: Dec. 10, 2019

(54) LASER ADJUSTMENT METHOD AND LASER SOURCE DEVICE

(71) Applicant: MITUTOYO CORPORATION, Kanagawa (JP)

(72) Inventors: Tatsuya Narumi, Kanagawa (JP); Yoichi Toida, Kanagawa (JP)

(73) Assignee: MITUTOYO CORPORATION, Kanagawa (JP)

(*) Notice: Subject to any disclaimer, the term of this patent is extended or adjusted under 35 U.S.C. 154(b) by 0 days.

(21) Appl. No.: 15/617,307

(22) Filed: Jun. 8, 2017

(65) Prior Publication Data

US 2017/0373463 A1   Dec. 28, 2017

(30) Foreign Application Priority Data

Jun. 22, 2016   (JP) .................................. 2016-123688

(51) Int. Cl.
*H01S 3/137* (2006.01)
*H01S 3/131* (2006.01)
(Continued)

(52) U.S. Cl.
CPC ............ *H01S 3/1317* (2013.01); *H01S 3/025* (2013.01); *H01S 3/0405* (2013.01); *H01S 3/109* (2013.01);
(Continued)

(58) Field of Classification Search
CPC ...... H01S 3/0405; H01S 3/109; H01S 3/1317; H01S 3/1062; H01S 3/137; H01S 3/042
(Continued)

(56) References Cited

U.S. PATENT DOCUMENTS 5,854,802 A * 12/1998 Jin .......................... H01S 3/109
372/22
5,949,805 A * 9/1999 Mordaunt ............... H01S 3/042
372/34
(Continued)

FOREIGN PATENT DOCUMENTS

JP   2000-208849   *   7/2000   ............. H01S 3/137
JP   3509598 B2   3/2004
(Continued)

OTHER PUBLICATIONS

English translation of JP2011249400, Dec. 8, 2011.*

*Primary Examiner* — Tod T Van Roy
(74) *Attorney, Agent, or Firm* — Greenblum & Bernstein, P.L.C.

(57) ABSTRACT

A laser adjustment method includes a first adjustment step and a second adjustment step. In the first adjustment step, using a light detector detecting a second harmonic light, optical intensity and wavelength of the second harmonic light is detected and a first temperature adjuster is adjusted to adjust temperatures of a $Nd:YVO_4$ crystal and a KTP crystal such that the detected wavelength of the second harmonic light approaches a desired wavelength and such that the optical intensity of the second harmonic light reaches at least a predetermined value. In the second adjustment step, after the first adjustment step, a temperature of an etalon is adjusted by a second temperature adjuster such that the detected wavelength of the second harmonic light approaches the desired wavelength and such that the optical intensity of the second harmonic light reaches at least a predetermined value.

19 Claims, 3 Drawing Sheets (51) Int. Cl.
  *H01S 3/13* (2006.01)
  *H01S 3/02* (2006.01)
  *H01S 3/04* (2006.01)
  *H01S 3/106* (2006.01)
  *H01S 3/109* (2006.01)
  *G02F 1/355* (2006.01)
  *H01S 3/16* (2006.01)

(52) U.S. Cl.
  CPC .......... *H01S 3/1062* (2013.01); *H01S 3/1303* (2013.01); *H01S 3/1305* (2013.01); *H01S 3/137* (2013.01); *G02F 1/3553* (2013.01); *H01S 3/0402* (2013.01); *H01S 3/1611* (2013.01); *H01S 3/1673* (2013.01)

(58) Field of Classification Search
  USPC .............................................. 372/34, 36, 22
  See application file for complete search history.

(56) References Cited

U.S. PATENT DOCUMENTS

| | | | |
|---|---|---|---|
| 8,958,446 B2 | 2/2015 | Hirose | |
| 9,525,266 B2 | 12/2016 | Miyata | |
| 2006/0268948 A1* | 11/2006 | May | G01J 3/02 372/20 |
| 2010/0246610 A1* | 9/2010 | Mirov | C30B 31/00 372/10 |
| 2016/0118769 A1 | 4/2016 | Narumi | |
| 2016/0240998 A1 | 8/2016 | Yano et al. | |

FOREIGN PATENT DOCUMENTS

| JP | 2011-100812 | * | 5/2011 |
|---|---|---|---|
| JP | 2011-249400 A | | 12/2011 |

\* cited by examiner

LASER ADJUSTMENT METHOD AND LASER SOURCE DEVICE

CROSS-REFERENCE TO RELATED APPLICATIONS

The present application claims priority under 35 U.S.C. § 119 of Japanese Application No. 2016-123688, filed on Jun. 22, 2016, the disclosure of which is expressly incorporated by reference herein in its entirety.

BACKGROUND OF THE INVENTION

1. Field of the Invention

The present invention relates to a laser adjustment method of a laser source device emitting laser light, and to the laser source device.

2. Description of Related Art

Conventionally, a laser source device is known that includes an excitation light source emitting excitation light, and a resonator receiving the excitation light from the excitation light source and generating laser light (see, for example, Japanese Patent No. 3,509,598 and Japanese Patent Laid-open Publication No. 2011-249400). Such a laser source device includes a solid laser medium such as a Nd:YVO$_4$ crystal inside a housing of the resonator; a nonlinear optical crystal second harmonic generation (SHG) element (such as a KTP crystal, for example); an etalon; and a resonator mirror. The excitation light from the semiconductor laser strikes the solid laser medium and causes the emission of fundamental wave light, the fundamental wave light is converted to harmonic light, and the harmonic light having a predetermined frequency passes through the etalon and is output from the resonator.

In this example, the laser source device disclosed in Japanese Patent No. 3,509,598 includes a resonator temperature adjustment mechanism and an etalon temperature adjustment mechanism. By performing resonator temperature control, the laser source device performs a stable wavelength conversion operation with the SHG element inside the resonator, and by performing etalon temperature control, the wavelength of the harmonic light is matched to a peak transmission wavelength of the etalon. Meanwhile, the laser source device disclosed in Japanese Patent Laid-open Publication No. 2011-249400 includes an SHG element (nonlinear optical crystal) temperature adjustment mechanism and a resonator temperature adjustment mechanism. In this laser source device, after performing SHG element temperature adjustment in a state where the etalon is removed from the resonator, the etalon is arranged inside the resonator and temperature control of the resonator is performed, thereby performing temperature control of the etalon.

In Japanese Patent No. 3,509,598, temperature control of the entire resonator and temperature control of the etalon are performed. However, in a case where the temperature of the resonator is different from the temperature of the etalon, each will affect the other. Furthermore, in Japanese Patent Laid-open Publication No. 2011-249400, after performing temperature control of the SHG element, the etalon is returned to the assembly and temperature control of the entire resonator is performed. However, in a case where the temperature of the resonator is different from the temperature of the SHG element, the SHG element will also be affected when performing temperature control of the entire resonator. In this way, there is difficulty setting the temperature of each element within the resonator to the optimum temperature with conventional configurations, and there is difficulty achieving high output of laser light at the desired wavelength.

SUMMARY OF THE INVENTION

The present invention provides a laser adjustment method capable of high output of laser light at the desired wavelength, and also provides a laser source device.

According to the present invention, a laser adjustment method in a laser source device including an excitation light source emitting excitation light; a laser medium receiving the excitation light and generating fundamental wave light; a nonlinear optical crystal converting the fundamental wave light to harmonic light having a desired wavelength; an etalon allowing light of a predetermined wavelength to pass; a resonator housing accommodating the laser medium, the nonlinear optical crystal, and the etalon on an interior of the resonator housing; a first temperature adjustment mechanism controlling temperatures of the laser medium and the nonlinear optical crystal; and a second temperature adjustment mechanism controlling a temperature of the etalon includes: a first adjustment step and a second adjustment step. In the first adjustment step, using a light detector detecting the harmonic light, optical intensity and wavelength of the harmonic light is detected and the first temperature adjustment mechanism is adjusted to adjust the temperatures of the laser medium and the nonlinear optical crystal such that the detected wavelength of the harmonic light approaches a desired wavelength and such that the optical intensity of the harmonic light reaches at least a predetermined value. In the second adjustment step, after the first adjustment step, the optical intensity and wavelength of the harmonic light is detected using the light detector and the temperature of the etalon is adjusted by the second temperature adjustment mechanism such that the detected wavelength of the harmonic light approaches the desired wavelength and such that the optical intensity of the harmonic light reaches at least a predetermined value.

In the laser source device according to the present invention, the temperatures of the laser medium and the nonlinear optical crystal (SHG element) can be controlled by the first temperature adjustment mechanism, and the temperature of the etalon can be controlled by the second temperature adjustment mechanism. In addition, in the present invention, based on detection results (wavelength and optical intensity) of the harmonic light detected by the detector, first, in the first adjustment step, the first temperature adjustment mechanism is controlled and the temperatures of the laser medium and the nonlinear optical crystal are optimized. In other words, the laser medium and the nonlinear optical crystal are set to a temperature capable of achieving high output of laser light having the desired wavelength, and this temperature is maintained by the first temperature adjustment mechanism. After this, the second adjustment step is executed, temperature adjustment of the etalon is performed, and the peak transmission wavelength passing through the etalon is matched to the desired wavelength. In the second adjustment step, an angle of the etalon relative to an optical axis of the resonator housing may also be adjusted as appropriate, in addition to the temperature of the etalon. In the second adjustment step, temperature conditions which are set in the first adjustment step are maintained by the first temperature adjustment mechanism, and therefore changes in temperature in the laser medium and nonlinear optical crystal when performing temperature control of the etalon can be inhibited. In other words, the laser medium and the nonlinear optical crystal are not affected by the temperature control occurring in the second adjustment step and can continue to output the optimized laser light (harmonic light) without alteration. Therefore, the present invention is capable of high output, from the laser source device, of laser light having the desired wavelength.

Preferably, in the laser adjustment method according to the present invention, the laser source device includes a third temperature adjustment mechanism controlling a temperature of the resonator housing, and the method executes a third adjustment step where the temperature of the resonator housing is maintained at a predefined reference temperature by the third temperature adjustment mechanism. In the present invention, by executing the third adjustment step, the temperature of the resonator housing is maintained at the reference temperature by the third temperature adjustment mechanism. Therefore, the first adjustment step and the second adjustment step are performed in a state where temperature conditions during wavelength stabilization of the laser light are uniform. Therefore, even in a case where the temperature of an environment around the laser source device changes due to a usage environment or the like, the temperatures of the laser medium, the nonlinear optical crystal, and the etalon can be set to optimum temperatures without being affected by the temperature change.

Preferably, in the laser adjustment method according to the present invention, the resonator housing includes supports supporting each of the laser medium, the nonlinear optical crystal, and the etalon, and the resonator housing and supports are configured by a material having thermal conductivity of at least 170 W/mK. In a conventional laser source device, the resonator housing is configured by a low expansion material having low thermal conductivity and a low linear expansion coefficient. This is because in cases where the temperatures of the laser medium and the nonlinear optical crystal are controlled by controlling the temperature of the resonator housing, as in Japanese Patent No. 3,509,598 as described above, or where the temperature of the etalon is controlled by controlling the temperature of the resonator housing, as in Japanese Patent Laid-open Publication No. 2011-249400, for example, changes in cavity length due to changing the temperature of the resonator housing are inhibited. Also, in the conventional laser source devices described above, in a case where the temperature of the resonator housing is different from the temperatures of each element, the set temperatures affect one another and temperature control becomes difficult. Accordingly, the resonator housing and the supports are configured by a material having low thermal conductivity and unfavorable situations where the set temperatures affect one another are inhibited. However, in such a case where the resonator housing is configured by a material having low thermal conductivity, a long period of time is required to make the temperature of the resonator housing uniform. In particular, in a case where the temperature of the environment changes over time, an even greater amount of time is required to make the temperature uniform. In contrast, in the present invention, the resonator housing is configured by a material having a thermal conductivity of at least 170 W/mK. Therefore, the temperature of the resonator housing can rapidly be made uniform, and a laser stabilization process can be performed in a state where temperature conditions are uniform. In addition, as described above, in the present invention, temperature effects between the laser medium and nonlinear optical crystal, the etalon, and the resonator housing can be inhibited, and therefore even in a case where a resonator housing having a high thermal conductivity is used, the effects can be inhibited. Also, the laser stabilization process is performed in a state where the resonator housing is held at the reference temperature, and thus there is no need to use a resonator housing configured by a low expansion material.

Preferably, in the laser adjustment method according to the present invention, the resonator housing and the supports are configured by beryllium copper. In the present invention, the resonator housing and the supports are configured by beryllium copper. Beryllium copper has a thermal conductivity of 170 to 260 W/mK and, as discussed above, is capable of rapidly making the temperature of the resonator housing uniform.

Preferably, in the laser adjustment method according to the present invention, the light detector includes an absorption cell which is struck by the harmonic light emitted from the resonator housing and which absorbs light having a predetermined wavelength; and a detector which receives the harmonic light passing through the absorption cell and outputs an output signal. Preferably, the first adjustment step and the second adjustment step control the first temperature adjustment mechanism and the second temperature adjustment mechanism such that a wavelength of saturated absorption lines of the absorption cell, based on the output signal from the detector, much the wavelength of the harmonic light. Accordingly, in the present invention, by detecting the saturated absorption lines contained in a second output signal and performing the first adjustment step and the second adjustment step such that the wavelength of the harmonic light is the same as the wavelength of the saturated absorption lines, the wavelength can be set to the desired wavelength with a high degree of accuracy.

A laser source device according to the present invention includes an excitation light source emitting excitation light; a laser medium receiving the excitation light and generating fundamental wave light; a nonlinear optical crystal converting the fundamental wave light to harmonic light having a desired wavelength; an etalon allowing light of a predetermined wavelength to pass; a resonator housing accommodating the laser medium, the nonlinear optical crystal, and the etalon on an interior of the resonator housing; a first temperature adjustment mechanism controlling temperatures of the laser medium and the nonlinear optical crystal; and a second temperature adjustment mechanism controlling a temperature of the etalon. The laser source device according to the present invention includes the first temperature adjustment mechanism controlling the temperatures of the laser medium and the nonlinear optical crystal and the second temperature adjustment mechanism controlling the temperature of the etalon, the first temperature adjustment mechanism and the second temperature adjustment mechanism being provided so as to be independent of each other. This enables adjustment of the laser light using the laser adjustment method described above, and allows high output of laser light having the desired wavelength (harmonic light).

Preferably, the laser source device according to the present invention includes a controller stabilizing output of the harmonic light, and based on detection results from a light detector detecting the wavelength and optical intensity of the harmonic light emitted from the resonator housing, the controller controls the first temperature adjustment mechanism and the second temperature adjustment mechanism such that the detected wavelength of the harmonic light approaches the desired wavelength, and such that the detected optical intensity of the harmonic light is at least a predetermined value, and the controller performs temperature adjustment in an order of adjusting the temperatures of the laser medium and the nonlinear optical crystal, then the temperature of the etalon. The controller controls the first temperature adjustment mechanism and the second temperature adjustment mechanism in that order, and thereby the laser source device according to the present invention can automatically perform the laser adjustment method described above and can improve user-friendliness.

Preferably, the laser source device according to the present invention further includes a third temperature adjustment mechanism controlling a temperature of the resonator housing, and the controller controls the third temperature adjustment mechanism and maintains the temperature of the resonator housing at a predefined reference temperature. In the present invention, the third temperature adjustment mechanism controlling the temperature of the resonator housing is provided, and therefore the temperature of the resonator housing can be maintained at the reference temperature and stable laser light can be output independent of changes in environmental temperature.

Preferably, in the laser source device according to the present invention, the resonator housing includes supports supporting each of the laser medium, the nonlinear optical crystal, and the etalon, and the resonator housing and supports are configured by a material having thermal conductivity of at least 170 W/mK. Preferably, the resonator housing and each of the supports are configured by beryllium copper. In the present invention, the resonator housing and the supports are configured by beryllium copper having thermal conductivity of at least 170 W/mK. Therefore, the temperature in the resonator housing can rapidly be made uniform and can be maintained at the reference temperature. Accordingly, a rapid laser stabilization process can be performed under temperature conditions where the temperature of the resonator is uniform.

The present invention is capable of high output, from a laser source device, of laser light having a desired wavelength.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Hereafter, an embodiment of the present invention is described.

Configuration of Laser Source Device

Figure 1:
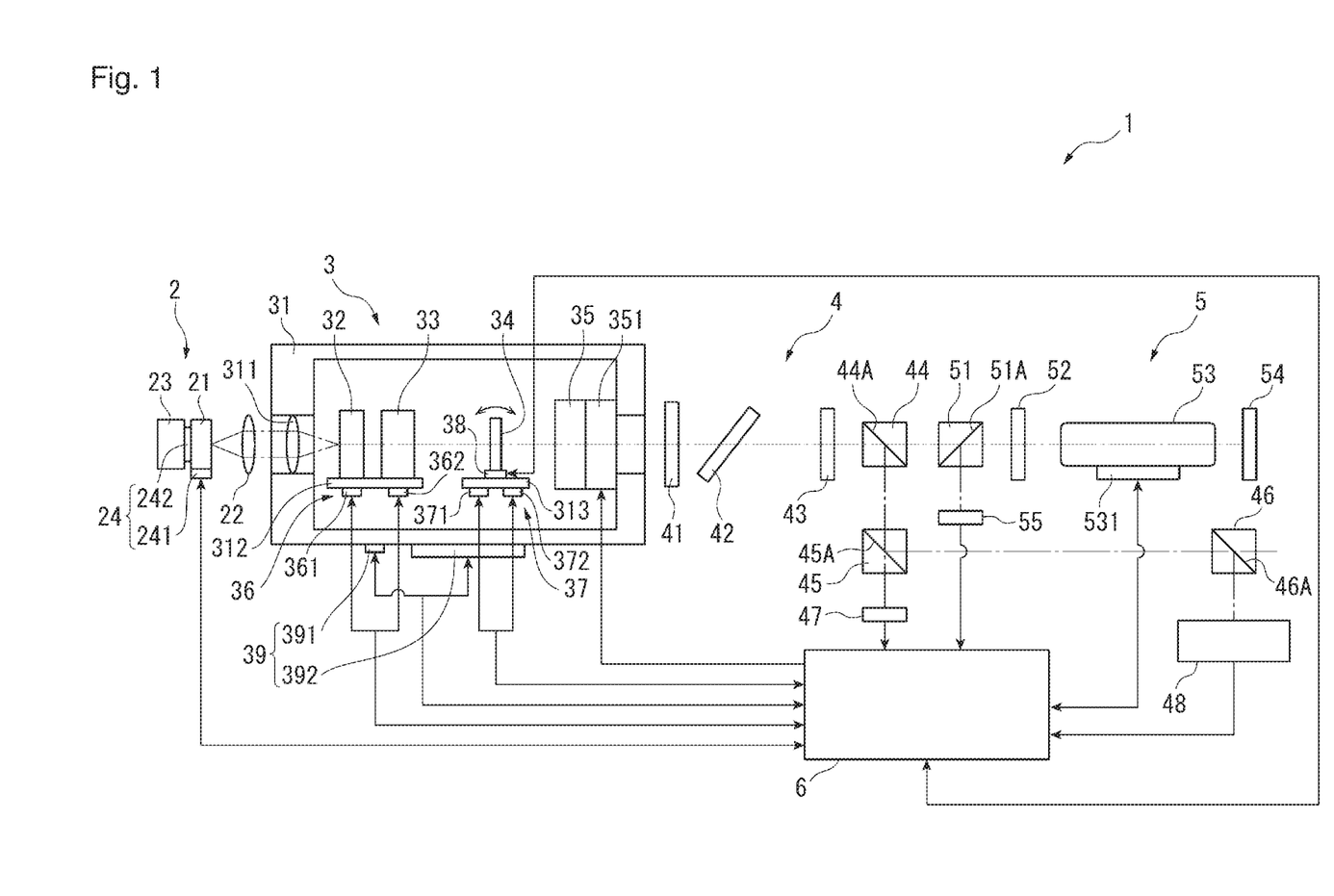
FIG. 1 is a block diagram illustrating a laser source device 1 according to an embodiment of the present invention.

FIG. 1 is a block diagram illustrating a laser source device 1 according to the present embodiment. As shown in FIG. 1, the laser source device 1 includes a light source 2 emitting light; a resonator 3; an optical guide 4 guiding the light emitted from the resonator 3 to an exterior of the laser source device 1; a saturated absorption line detector 5 detecting saturated absorption lines of iodine by modulating the light emitted from the resonator 3; and a control unit 6 controlling the laser source device 1. The light source 2 is an excitation light source and includes, for example, a semiconductor laser 21 emitting light (excitation light) at a wavelength in the neighborhood of 808 nm; a collimator lens 22 collimating the excitation light emitted from the semiconductor laser 21; a heat sink plate 23 allowing heat of the semiconductor laser 21 to escape; and a light source temperature adjustment mechanism (a light source temperature adjuster) 24 controlling a temperature of the light source 2. The light source temperature adjustment mechanism 24 may include, for example, a temperature sensor 241 configured by a thermistor or the like, and a temperature adjuster 242 configured by a Peltier element or the like adjusting the temperature. By adjusting the temperature of the semiconductor laser 21 with the light source temperature adjustment mechanism 24, excitation light capable of generating fundamental wave light can be stably output.

Configuration of Resonator

The resonator 3 includes a housing 31 (resonator housing). On an interior of the housing 31, the resonator 3 includes a focusing lens 311 focusing the excitation light collimated by the collimator lens 22; a Nd:YVO$_4$ crystal 32 (laser medium) excited by the excitation light focused by the focusing lens 311 and emitting light at a wavelength in the neighborhood of 1064 nm (fundamental wave light); a KTP crystal 33 (nonlinear optical crystal) transforming the fundamental wave light emitted from the Nd:YVO$_4$ crystal 32 into light having a wavelength in the neighborhood of 532 nm (second harmonic light); an etalon 34 arranged at a latter stage of an optical path of the KTP crystal 33; a resonator mirror 35; a first temperature adjustment mechanism (first temperature adjuster) 36 controlling temperatures of the Nd:YVO$_4$ crystal 32 and the KTP crystal 33; a second temperature adjustment mechanism (second temperature adjuster) 37 controlling a temperature of the etalon 34; and an angle adjustment mechanism (angle adjuster) 38 adjusting an angle of the etalon 34. A third temperature adjustment mechanism (third temperature adjuster) 39 adjusting a temperature of the housing 31 itself is also provided to the housing 31.

More specifically, the housing 31 includes, on the interior thereof, a laser element support 312 supporting the Nd:YVO$_4$ crystal 32 and the KTP crystal 33; and an etalon support 313 supporting the etalon 34. The resonator mirror 35 is attached to the housing 31 with a piezo element 351 interposed therebetween. The resonator mirror 35 can displace along an optical axis direction of the resonator 3 (cavity length can be modified) by controlling voltage applied to the piezo element 351. In addition, the laser element support 312 and the etalon support 313 may be configured so as to be integral with the housing 31, or may be separate and attached to the housing 31. The housing 31, laser element support 312, and etalon support 313 are configured by materials having thermal conductivity of at least 170 W/mK, and in the present embodiment are configured by beryllium copper (thermal conductivity of 170 to 260 W/mK).

Compared to a ceramic (thermal conductivity of 10 to 15 W/mK) or the like used in a conventional laser source device, the beryllium copper has extremely high thermal conductivity. With the housing 31 described above, when temperature control is performed by the third temperature adjustment mechanism 39, the temperature can be quickly made uniform with a defined temperature. In other words, in a housing configured by a material having low thermal conductivity, as in conventional cases, the temperature has difficulty propagating and therefore a long period of time is required for the entire resonator to achieve a uniform temperature, increasing the amount of time that a laser stabilization process is performed. In contrast, with the housing 31 of the present embodiment, which has a high degree of thermal conductivity, when temperature control of the housing 31 is performed by the third temperature adjustment mechanism 39, the temperature can be quickly made uniform with the defined temperature. Also, in a case where thermal conductivity is low, when a surrounding environment changes and causes a change in temperature at a site on the housing 31 far from the third temperature adjustment mechanism 39, the temperature has difficulty propagating from that location to the third temperature adjustment mechanism 39. Accordingly, a temperature distribution of the housing 31 is likely to become non-uniform. In contrast, in the present embodiment, even when a change in temperature occurs in a portion of the housing 31, that temperature is rapidly transmitted to the third temperature adjustment mechanism 39, enabling immediate temperature adjustment.

As described above, the Nd:YVO$_4$ crystal 32 and KTP crystal 33 are mounted to the laser element support 312. In this example, a semiconductor laser 21-side surface of the Nd:YVO$_4$ crystal 32 is provided with a coating allowing the excitation light to pass and reflecting the fundamental wave light, and a Nd:YVO$_4$ crystal 32-side surface of the resonator mirror 35 is provided with a coating reflecting the fundamental wave light and allowing the second harmonic light to pass. Accordingly, the fundamental wave light circulates between the Nd:YVO$_4$ crystal 32 and the resonator mirror 35 creating multimode oscillation, whereas the second harmonic light passes through the resonator mirror 35 and is emitted from the resonator 3. In the present embodiment, the Nd:YVO$_4$ crystal 32 is given as an exemplary laser medium, but the present invention is not limited to this and a Nd:YAG crystal or the like may be used instead. Also, the KTP crystal 33 is given as an exemplary nonlinear optical crystal, but the present invention is not limited to this and a BBO crystal, LBO crystal, or the like may be used instead.

As shown in FIG. 1, the first temperature adjustment mechanism 36 is provided to the laser element support 312. The first temperature adjustment mechanism 36 may include, for example, a temperature sensor 361 configured by a thermistor or the like detecting the temperature, and a temperature adjuster 362 configured by a Peltier element or the like adjusting the temperature. The first temperature adjustment mechanism 36 is connected to the control unit 6, and the temperature detected by the temperature sensor 361 is output to the control unit 6. Based on a control signal input from the control unit 6, the temperature 362 modifies and maintains the temperatures of the Nd:YVO$_4$ crystal 32 and the KTP crystal 33 at a predetermined value.

As noted above, the etalon 34 is arranged on the optical axis on the interior of the resonator 3 and allows light of a predetermined wavelength to pass therethrough. The etalon 34 is capable of converting the fundamental wave light, which oscillates in multiple modes, to a single mode. By converting the fundamental wave light to a single mode, the second harmonic light transformed by the KTP crystal 33 can also be converted to a single mode. The etalon 34 is supported by the etalon support 313, and an angle of the etalon 34 relative to the optical axis of the resonator 3 can be modified using the angle adjustment mechanism 38. The angle adjustment mechanism 38 is configured by an actuator, for example, and can be driven by control from the control unit 6. Also, the second temperature adjustment mechanism 37 is provided to the etalon support 313. The second temperature adjustment mechanism 37 has a configuration similar to that of the first temperature adjustment mechanism 36 and can be configured by, for example, a temperature sensor 371 and a temperature adjuster 372, and can set the temperature of the etalon 34 to a predetermined value with the control unit 6.

The resonator 3 may also include, for example, a KTP angle adjuster changing an angle of the KTP crystal 33 relative to the optical axis of the resonator 3.

Configuration of Optical Guide

The optical guide 4 includes filters 41 and 42 arranged at a latter stage of the optical path of the resonator 3; a half waveplate 43 adjusting a polarization direction of light that has passed through the filters 41 and 42; and a polarizing beam splitter 44 splitting the light whose polarization direction has been adjusted by the half waveplate 43. The filter 41 attenuates the excitation light (light escaping from the resonator 3). The filter 42 is arranged so as to be inclined with respect to the optical axis of the laser source device 1, and reflects the fundamental wave light (light escaping from the resonator 3). Therefore, the light reflecting off the filter 42 is guided in a direction away from the optical axis of the laser source device 1. In other words, the second harmonic light that passes through the filters 41 and 42 strikes the half waveplate 43. The polarizing beam splitter 44 includes a polarizing separation film 44A. Of the light emitted from the half waveplate 43 and striking the polarizing beam splitter 44, P polarized light passes through the polarizing separation film 44A and S polarized light reflects off the polarizing separation film 44A.

The optical guide 4 includes two beam splitters 45 and 46 splitting the S polarized light reflected by the polarizing beam splitter 44; an intensity detector 47 detecting optical intensity of the light split by each of the beam splitters 45 and 46; and a wavelength detector 48 detecting a wavelength and spectrum of the light split by each of the beam splitters 45 and 46. Each of the beam splitters 45 and 46 has the same role: to reflect a portion of incident light with an interface 45A or 46A, respectively, and to allow another portion of the incident light to pass. The light passing through the beam splitter 46 is emitted to the exterior of the laser source device 1 and is used as laser light used in length measurement or the like.

Next, the optical path in the optical guide 4 is described. The S polarized light reflected by the polarizing beam splitter 44 strikes the beam splitter 45. Of the light striking the beam splitter 45, the light that passes through the beam splitter 45 strikes the intensity detector 47. The intensity detector 47 then detects the optical intensity of the incident light and outputs to the control unit 6 a signal based on the detected optical intensity.

The light reflected by the beam splitter 45 strikes the beam splitter 46. Of the light striking the beam splitter 46, the light reflected by the beam splitter 46 strikes the wavelength detector 48. The wavelength detector 48 then detects the wavelength of the incident light and outputs to the control unit 6 a signal based on the detected wavelength of the light. The light passing through the beam splitter 46 is emitted to the exterior of the laser source device 1. Examples of the wavelength detector 48 can include a detector using diffraction grating, or a detector using a Michelson interferometer. In a case using the detector having diffraction grating, a direction in which light is reflected by the diffraction grating differs according to the wavelength of the incident light. Therefore, the wavelength can be measured by detecting a position and amount of light detected for the light reflected by the diffraction grating. Alternatively, with the Michelson interferometer, the wavelength of measured laser light and the wavelength of a reference laser light are compared to measure the wavelength of the measured laser light.

Configuration of Saturated Absorption Line Detector

The saturated absorption line detector 5 is an optical detector according to the present invention and includes a polarizing beam splitter 51 which is struck by the P polarized light passing through the polarizing beam splitter 44; a quarter waveplate 52 which is struck by the light passing through the polarizing beam splitter 51; au iodine cell 53 (absorption cell) arranged at a latter stage of an optical path of the quarter waveplate 52; a reflecting mirror 54 reflecting the light passing through the iodine cell 53; and an intensity detector 55 (optical detector) detecting the optical intensity of light reflected by the polarizing beam splitter 51. A cell temperature adjustment mechanism (cell temperature adjuster) 531 configured by a thermistor or temperature adjuster is mounted to the iodine cell 53. By adjusting the temperature of the iodine cell 53 to a predetermined reference value, absorption lines (wavelength) of iodine are set to a desired value. The polarizing beam splitter 51 includes a polarizing separation film 51A and operates similarly to the polarizing beam splitter 44. Also, the quarter waveplate 52 delays a phase of the incident light by 90°.

Next, the optical path in the saturated absorption line detector 5 is described. The P polarized light passing through the polarizing beam splitter 44 passes through the polarizing beam splitter 51 and strikes the iodine cell 53 via the quarter waveplate 52. The light passing through the iodine cell 53 is reflected by the reflecting mirror 54; passes through the iodine cell 53 and the quarter waveplate 52; and once again strikes the polarizing beam splitter 51. At this point, the light that is once again striking the polarizing beam splitter 51 transits the quarter waveplate 52 a second time, and therefore the polarization direction is rotated 90° and the light is converted to S polarized light relative to the polarizing separation film 51A. Accordingly, the light that is once again striking the polarizing beam splitter 51 is reflected by the polarizing separation film 51A. The light reflected by the polarizing beam splitter 51 strikes the intensity detector 55. The intensity detector 55 then detects the optical intensity of the incident light and outputs to the control unit 6 a light output signal based on the detected optical intensity.

Configuration of Control Unit

Figure 2:
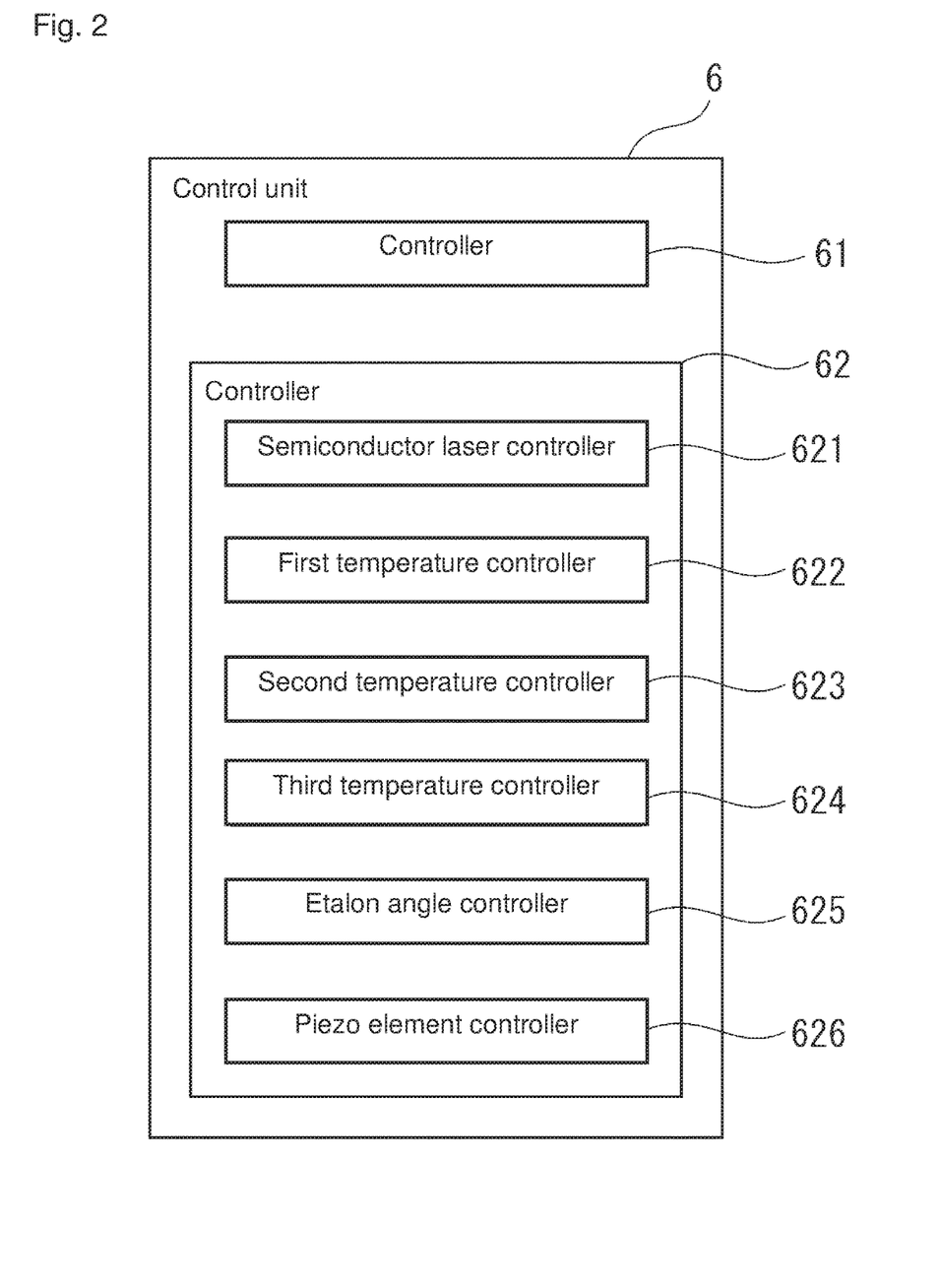
FIG. 2 is a block diagram illustrating a configuration of operations of a control unit according to the embodiment.

FIG. 2 is a block diagram illustrating the control unit 6 of the present embodiment. The control unit 6 includes a storage portion 61 configured by a memory or the like, and a controller 62 configured by a CPU (Central Processing Unit) or the like. As shown in FIG. 2, by retrieving and executing a program stored in the storage portion 61, the controller 62 carries out operations as a semiconductor laser controller 621, a first temperature controller 622, a second temperature controller 623, a third temperature controller 624, an etalon angle controller 625, a piezo element controller 626, and the like.

Based on signals output from the intensity detector 47 and the intensity detector 55, the semiconductor laser controller 621 performs control of electric current driving the semiconductor laser 21 and control of the light source temperature adjustment mechanism 24 such that the optical intensity of the second harmonic light emitted from the resonator 3 is constant. The first temperature controller 622 detects the temperatures of the Nd:YVO$_4$ crystal 32 and the KTP crystal 33 based on an output signal output from the temperature sensor 361 of the first temperature adjustment mechanism 36. Based on output signals output from the intensity detector 47, the wavelength detector 48, and the intensity detector 55, the first temperature controller 622 also outputs a control signal to the temperature adjuster 362 of the first temperature adjustment mechanism 36 and modifies or maintains the temperatures of the Nd:YVO$_4$ crystal 32 and the KTP crystal 33.

The second temperature controller 623 detects the temperature of the etalon 34 based on an output signal output from the temperature sensor 371 of the second temperature adjustment mechanism 37. Based on output signals output from the intensity detector 47, the wavelength detector 48, and the intensity detector 55, the second temperature controller 623 also outputs a control signal to the temperature adjuster 372 of the second temperature adjustment mechanism 37 and modifies or maintains the temperature of the etalon 34. The third temperature controller 624 detects the temperature of the housing 31 of the resonator 3 based on an output signal output from the temperature sensor 391 of the third temperature adjustment mechanism 39. The third temperature controller 624 also outputs a control signal to the temperature adjuster 392 of the third temperature adjustment mechanism 39 and maintains the temperature of the housing 31 at the reference temperature.

Based on output signals output from the intensity detector 47, the wavelength detector 48, and the intensity detector 55, the etalon angle controller 625 controls the angle adjustment mechanism 38 and modifies the angle of the etalon 34 relative to the optical axis of the resonator 3. Based on output signals output from the intensity detector 47, the wavelength detector 48, and the intensity detector 55, the piezo element controller 626 controls the voltage to the piezo element 351 and modifies the position of the resonator mirror 35.

Laser Adjustment Method of Laser Source Device

Figure 3:
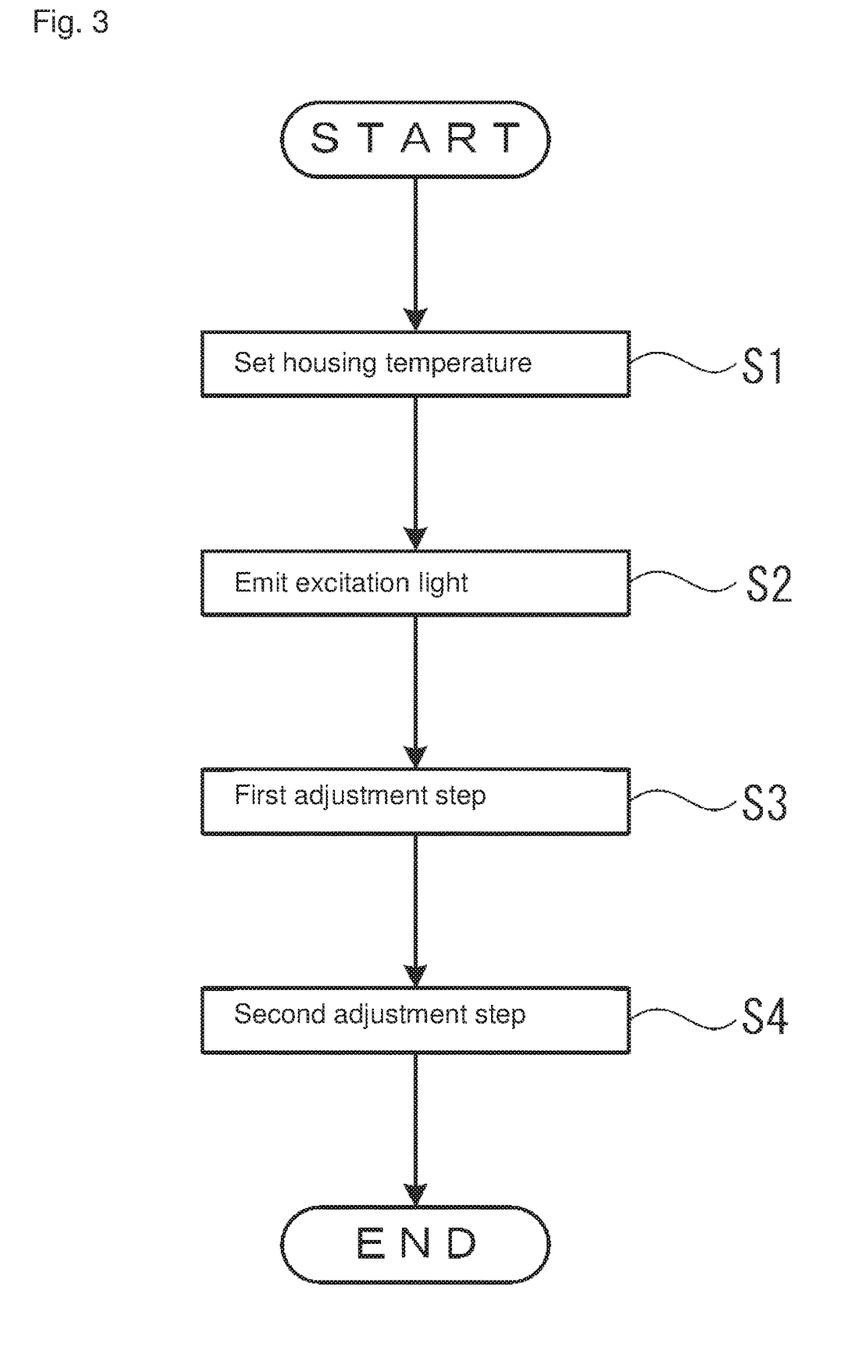
FIG. 3 is a flow chart illustrating a laser adjustment process according to the embodiment.

Next, a laser adjustment process of the laser source device 1 is described. FIG. 3 is a flow chart illustrating the laser adjustment process. In a case where the laser source device 1 is used, the laser adjustment process is executed in order to output, at a high optical intensity, laser light having a desired wavelength. The desired wavelength may be defined as a wavelength enabling stable detection of the saturated absorption lines of iodine. Specifically, the control unit 6 first controls the third temperature adjustment mechanism 39, sets the temperature of the housing 31 of the resonator 3 to the predetermined reference temperature (for example, 20° C.), and maintains that temperature (step S1). With step S1, temperature conditions of the housing 31 are made uniform.

Next, the semiconductor laser controller 621 of the control unit 6 controls the electric current flowing to the semiconductor laser 21 and the temperature, and causes excitation light to be emitted (step S2). When the excitation light from the semiconductor laser 21 strikes the Nd:YVO$_4$ crystal 32, the fundamental wave light is excited and is emitted, and the wavelength of the fundamental wave light is transformed by the KTP crystal 33 to be the second harmonic light. In step S1, the electric current flowing to the semiconductor laser 21 and the temperature are controlled so as to maximize the output signal output from the intensity detector 47 (i.e., so as to maximize the optical intensity of the second harmonic light). Accordingly, excitation light having the optimum wavelength is emitted from the semiconductor laser 21.

Next, the first temperature controller 622 controls the first temperature adjustment mechanism 36 and adjusts the temperatures of the Nd:YVO$_4$ crystal 32 and the KTP crystal 33 (step S3: first adjustment step or first adjustment process). Specifically, the first temperature controller 622 adjusts the temperatures of the Nd:YVO$_4$ crystal 32 and the KTP crystal 33 such that the saturated absorption lines of iodine (based on the output signal from the intensity detector 55) and the wavelength detected by the wavelength detector 48 (peak wavelength in the spectrum) match, and such that the optical intensity detected by the intensity detector 47 is maximized. In step S3, the wavelength of the laser light emitted from the Nd:YVO$_4$ crystal 32 and the KTP crystal 33 (second harmonic light) is stabilized. Also, in step S1, the temperature of the housing 31 of the resonator 3 is set to the reference temperature and this temperature is maintained also in step S3. Accordingly, even when the temperatures of the Nd:YVO$_4$ crystal 32 and the KTP crystal 33 are changed by step S3, the temperature of the housing 31 does not change.

Next, the angle and temperature of the etalon 34 are adjusted (step S4: second adjustment step or second adjustment process). In step S4, the angle adjustment mechanism 38 is controlled by the etalon angle controller 625 to adjust the angle of the etalon 34, and the second temperature adjustment mechanism 37 is controlled by the second temperature controller 623 to adjust the temperature of the etalon 34. Specifically, the etalon angle controller 625 and the second temperature controller 623 control the angle and temperature of the etalon 34 such that a difference value between the wavelength of the saturated absorption lines of iodine (based on the output signal from the intensity detector 55) and the wavelength detected by the wavelength detector 48 (peak transmission wavelength of the etalon 34) are within a predetermined error range, and such that the optical intensity detected by the intensity detector 47 is at least the optical intensity for the wavelength of the iodine saturated absorption lines detected by the intensity detector 55. At this point, the voltage applied to the piezo element 351 is controlled by the piezo element controller 626 and the cavity length is scanned (wavelength scanning), and the angle of the etalon 34 is set such that the desired wavelength is in the middle of a wavelength scanning range. In step S4, by changing the angle of the etalon 34, the optical path length of the light transiting the interior of the etalon 34 is changed, and by changing the temperature of the etalon 34, the optical path length is changed due to thermal expansion of the etalon 34 (fluctuation in distance between mirrors). Accordingly, the peak transmission wavelength of the light passing through the etalon 34 changes.

As noted above, in step S1, the temperature of the housing 31 is maintained at the reference temperature. Therefore, even when the temperature of the etalon 34 is changed in step S4, the temperature of the housing 31 is maintained at the reference temperature. Also, when the temperatures of the Nd:YVO$_4$ crystal 32 and the KTP crystal 33 are set in step S3, the first temperature controller 622 detects the temperatures with the temperature sensor 361 and stores the temperatures in the storage portion 61, and controls the first temperature adjustment mechanism 36 so as to maintain the temperatures. Accordingly, even when the temperature of the etalon 34 is changed in step S4, there is no temperature change in the Nd:YVO$_4$ crystal 32 and the KTP crystal 33. After the above, the laser adjustment process ends.

Advantage of Present Embodiment

The laser source device 1 according to the present embodiment includes the light source 2 and the resonator 3. The light source 2 includes the semiconductor laser 21, which emits excitation light. The resonator 3 houses the Nd:YVO$_4$ crystal 32, which receives excitation light and generates fundamental wave light; the KTP crystal 33, which converts the fundamental wave light to second harmonic light having the desired wavelength; the etalon 34, which allows light having the predetermined wavelength to pass; the housing 31, which houses the Nd:YVO$_4$ crystal 32, the KTP crystal 33, and the etalon 34 on the interior of the housing 31; the first temperature adjustment mechanism 36 controlling the temperatures of the Nd:YVO$_4$ crystal 32 and the KTP crystal 33; and the second temperature adjustment mechanism 37 controlling the temperature of the etalon 34. Also, in an exemplary laser adjustment method of the laser source device 1 having the above configuration, the first adjustment step is executed and, based on detection results detected by the intensity detectors 47 and 55 and the wavelength detector 48, the temperatures of the Nd:YVO$_4$ crystal 32 and the KTP crystal 33 are optimized, after which the second adjustment step is executed and the temperature of the etalon 34 is optimized. In other words, first, the first temperature controller 622 of the control unit 6 enters a state where the Nd:YVO$_4$ crystal 32 and the KTP crystal 33 favorably output laser light having the desired wavelength, and this state is maintained. Then, the second temperature controller 623 makes adjustments such that the light having the desired wavelength passes through the etalon 34 as the peak transmission wavelength. With this laser adjustment method, when the temperature of the etalon 34 is adjusted, the temperatures of the Nd:YVO$_4$ crystal 32 and the KTP crystal 33 are not affected. Unfavorable situations where the wavelength and intensity of the laser light become unstable due to temperature changes can therefore be inhibited, and a high output of the laser light having the desired wavelength can be achieved.

In the embodiment above, step S1 is executed prior to the first adjustment step and the second adjustment step, and the third temperature controller 624 controls the third temperature adjustment mechanism 39, the temperature of the housing 31 of the resonator 3 is set to the predefined reference temperature, and that temperature is maintained. Therefore, the first adjustment step and the second adjustment step are performed in a state where the temperature conditions during execution of a wavelength stabilization process on the laser light are uniform. Therefore, even in a case where the temperature of the environment around the laser source device 1 changes due to a usage environment or the like, an effect of the temperature change can be reduced and laser light having a stabilized wavelength and intensity and be output.

In the present embodiment, the housing 31, the laser element support 312, and the etalon support 313 are configured by a material having thermal conductivity of at least 170 W/mK, and more specifically are configured by beryllium copper. By using the housing 31 of this kind, the temperature of the resonator 3 can be rapidly made uniform, and laser light stabilized at the desired wavelength can be rapidly output. In addition, temperature control by the third temperature adjustment mechanism 39 rapidly propagates through all of the housing 31 and supports (laser element support 312 and etalon support 313), and therefore, even in a case where the temperature in the environment around the resonator 3 changes, the present embodiment is capable of adapting rapidly, and the temperature of the resonator 3 can be made uniform with a high degree of accuracy.

Table 1, below, provides a table comparing linear expansion coefficient, allowable temperature difference of resonator, and allowable cavity length dimensional error for the resonator 3 of the present embodiment having the housing 31 configured by beryllium copper, and for a conventional resonator having a housing configured by a low expansion material.

TABLE 1

| Material of resonator housing | Linear expansion coefficient ($K^{-1}$) | Cavity length (μm) | Allowable temperature difference of resonator portion (° C.) | Allowable cavity length dimensional error (μm) |
| --- | --- | --- | --- | --- |
| Low expansion material | 3.00E−06 | 45000 | 1.48 | 0.1998 |
| Beryllium copper | 1.70E−05 | 45000 | 0.26 | 0.1989 |

In the present embodiment, the housing 31 configured with beryllium copper is used instead of the conventionally-employed housing configured with a low expansion material. As shown in Table 1, beryllium copper has a larger linear expansion coefficient than the conventional low expansion material, and undergoes a greater change in cavity length due to changes in temperature. Therefore, conventionally, in order for the cavity length to be within the allowable dimensional error, the allowable temperature difference of the resonator is set to 1.48° C., as shown in Table 1. In contrast, the allowable temperature difference in the present embodiment is set to 0.26° C. When the temperature of the resonator 3 is within a range within the allowable temperature difference from the reference temperature, the cavity length is within the allowable dimensional error and effects on the wavelength and output of the laser light are in an allowable range. The present embodiment constrains the allowable temperature difference further than the conventional example. However, because thermal conductivity of beryllium copper is high (with a conventional low expansion material, 10 to 15 W/mK), temperature control by the third temperature adjustment mechanism 39 can be performed rapidly and with a high degree of accuracy, as described above.

In the present embodiment, the iodine cell 53 is used, and by performing wavelength stabilization of the saturated absorption lines of iodine, the wavelength of the laser light is highly stabilized. In the wavelength stabilization method of this kind using the iodine cell 53, saturated absorption lines can be obtained in a specific wavelength region. Accordingly, in the wavelength region where the desired saturated absorption lines are obtained, the laser light which has been converted to a single mode must be oscillated at a sufficiently high optical intensity. In contrast, in the laser adjustment method according to the present embodiment and described above, a wavelength enabling stable detection of the saturated absorption lines of iodine is defined as the desired wavelength. Accordingly, the desired saturated absorption lines can be stably detected from the light output signal detected by the intensity detector 55, and based on these saturated absorption lines, the wavelength of the laser light can be highly stabilized.

Modification

The present invention is not limited to the above-described embodiment, and includes modifications and improvements within a scope capable of achieving the advantages of the present invention. For example, in the embodiment described above, in the second adjustment step, the temperature and angle of the etalon 34 are adjusted. However, the angle of the etalon 34 may be adjusted first, after which the temperature of the etalon 34 may be adjusted. There is a greater amount of wavelength shift due to a change in the angle of the etalon 34 than the amount of wavelength shift due to a change in the temperature of the etalon 34. Therefore, in the adjustment method described above, rough adjustments are made and then slight adjustments are made, and the angle and temperature of the etalon 34 can be adjusted both rapidly and with a favorable degree of accuracy.

In the embodiment described above, an exemplary configuration is given in which the temperature of the entire resonator 3 is maintained by the third temperature adjustment mechanism 39. However, the present invention is not limited to this. For example, in a case where the laser source device 1 is used in a usage environment where the environmental temperature is kept constant, the third temperature adjustment mechanism 39 may be omitted. Also, in such a case, the housing 31 may be configured by a material having low thermal conductivity, and an effect on the temperatures of the Nd:YVO$_4$ crystal 32 and KTP crystal 33 during temperature adjustment of the etalon 34 can be reduced.

In the embodiment described above, an example is given in which the laser light stabilization process is performed by using the iodine cell 53 (absorption cell) and detecting the saturated absorption lines, and by matching the wavelength of the second harmonic light to the wavelength of the saturated absorption lines. However, the present invention is not limited to this. For example, a configuration is also possible in which no absorption cell is provided and the wavelength of the laser light is adjusted to the desired wavelength based only on the wavelength detected by the wavelength detector 48.

In the embodiment described above, an example is given in which the housing 31, the laser element support 312, and the etalon support 313 are each configured by beryllium copper. However, a configuration is also possible in which only an exterior portion of the housing 31 is configured by beryllium copper while the laser element support 312 and the etalon support 313 are configured by some other material (for example, a material having low thermal conductivity, such as ceramic).

Also, in the embodiment described above, an exemplary configuration is given in which the wavelength of the emitted laser light is detected by the wavelength detector 48. However, the present invention is not limited to this, and a configuration is also possible in which, for example, the wavelength of the laser light is detected using only detection of the saturated absorption lines of iodine detected by the saturated absorption line detector 5.

Other specific structures in embodiments of the present invention can be modified as appropriate to alternative structures as long as the advantage of the present invention can be achieved.

The present invention can be used in a laser source device that includes an excitation light source emitting excitation light and a resonator generating laser light generated by the excitation light.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A laser adjustment method in a laser source device including an excitation light source emitting excitation light; a laser medium receiving the excitation light and generating fundamental wave light; a nonlinear optical crystal converting the fundamental wave light to harmonic light having a desired wavelength; an etalon allowing light of a predetermined wavelength to pass; a resonator housing accommodating the laser medium, the nonlinear optical crystal, and the etalon on an interior of the resonator housing; a first temperature adjuster controlling temperatures of the laser medium and the nonlinear optical crystal; a second temperature adjuster controlling a temperature of the etalon; and a controller controlling the first temperature adjuster and the second temperature adjuster, the laser adjustment method comprising:
    a first adjustment process comprising:
        detecting, using a light detector, optical intensity and wavelength of the harmonic light, and
        adjusting, using the first temperature adjuster, the temperatures of the laser medium and the nonlinear optical crystal such that the detected wavelength of the harmonic light approaches a desired wavelength and such that the optical intensity of the harmonic light reaches at least a first predetermined value corresponding to the maximum output signal output from the light detector; and
    a second adjustment process comprising:
        detecting, after the first adjustment process and using the light detector, the optical intensity and wavelength of the harmonic light, and
        adjusting the angle of the etalon using an etalon angle controller and subsequently adjusting, using the second temperature adjuster, the temperature of the etalon such that the detected wavelength of the harmonic light approaches the desired wavelength and such that the optical intensity of the harmonic light reaches at least an optical intensity for the detected wavelength of the harmonic light detected by the light detector, while maintaining the adjusted temperatures of the laser medium and the nonlinear optical crystal based on a control signal received from the controller.

2. The laser adjustment method according to claim 1, wherein the laser source device further includes a third temperature adjuster controlling a temperature of the resonator housing, the laser adjustment method further comprising maintaining, using the third temperature adjuster, the temperature of the resonator housing at a predefined reference temperature.

3. The laser adjustment method according to claim 2, wherein:
    the resonator housing further includes supports supporting each of the laser medium, the nonlinear optical crystal, and the etalon, and
    the resonator housing and supports are constructed of a material having a thermal conductivity of at least 170 W/mK.

4. The laser adjustment method according to claim 3, wherein the resonator housing and the supports are constructed of beryllium copper.

5. The laser adjustment method according to claim 4, wherein the light detector includes:
    an absorption cell which receives the harmonic light emitted from the resonator housing and which absorbs light having a predetermined wavelength; and
    a detector which receives the harmonic light passing through the absorption cell and outputs an output signal, wherein the first adjustment process and the second adjustment process respectively control the first temperature adjuster and the second temperature adjuster such that a wavelength of saturated absorption lines of the absorption cell, based on the output signal from the detector, match the wavelength of the harmonic light.

6. The laser adjustment method according to claim 3, wherein the light detector includes:
    an absorption cell which receives the harmonic light emitted from the resonator housing and which absorbs light having a predetermined wavelength; and
    a detector which receives the harmonic light passing through the absorption cell and outputs an output signal, wherein the first adjustment process and the second adjustment process respectively control the first temperature adjuster and the second temperature adjuster such that a wavelength of saturated absorption lines of the absorption cell, based on the output signal from the detector, match the wavelength of the harmonic light.

7. The laser adjustment method according to claim 2, wherein the light detector includes:
    an absorption cell which receives the harmonic light emitted from the resonator housing and which absorbs light having a predetermined wavelength; and
    a detector which receives the harmonic light passing through the absorption cell and outputs an output signal, wherein the first adjustment process and the second adjustment process respectively control the first temperature adjuster and the second temperature adjuster such that a wavelength of saturated absorption lines of the absorption cell, based on the output signal from the detector, match the wavelength of the harmonic light.

8. The laser adjustment method according to claim 1, wherein:

the resonator housing further includes supports supporting each of the laser medium, the nonlinear optical crystal, and the etalon, and the resonator housing and supports are constructed of a material having a thermal conductivity of at least 170 W/mK.

9. The laser adjustment method according to claim 8, wherein the resonator housing and the supports are constructed of beryllium copper.

10. The laser adjustment method according to claim 9, wherein the light detector includes:

an absorption cell which receives the harmonic light emitted from the resonator housing and which absorbs light having a predetermined wavelength; and a detector which receives the harmonic light passing through the absorption cell and outputs an output signal, wherein the first adjustment process and the second adjustment process respectively control the first temperature adjuster and the second temperature adjuster such that a wavelength of saturated absorption lines of the absorption cell, based on the output signal from the detector, match the wavelength of the harmonic light.

11. The laser adjustment method according to claim 8, wherein the light detector includes:

an absorption cell which receives the harmonic light emitted from the resonator housing and which absorbs light having a predetermined wavelength; and a detector which receives the harmonic light passing through the absorption cell and outputs an output signal, wherein the first adjustment process and the second adjustment process respectively control the first temperature adjuster and the second temperature adjuster such that a wavelength of saturated absorption lines of the absorption cell, based on the output signal from the detector, match the wavelength of the harmonic light.

12. The laser adjustment method according to claim 1, wherein the light detector includes:

an absorption cell which receives the harmonic light emitted from the resonator housing and which absorbs light having a predetermined wavelength; and a detector which receives the harmonic light passing through the absorption cell and outputs an output signal, wherein the first adjustment process and the second adjustment process respectively control the first temperature adjuster and the second temperature adjuster such that a wavelength of saturated absorption lines of the absorption cell, based on the output signal from the detector, match the wavelength of the harmonic light.

13. A laser source device comprising:

an excitation light source configured to emit excitation light;

a laser medium configured to receive the excitation light and generate fundamental wave light;

a nonlinear optical crystal configured to convert the fundamental wave light to harmonic light having a predetermined wavelength;

an etalon configured to allow light of a predetermined wavelength to pass therethrough;

a resonator housing configured to accommodate the laser medium, the nonlinear optical crystal, and the etalon on an interior of the resonator housing;

a first temperature adjuster configured to control temperatures of the laser medium and the nonlinear optical crystal;

a second temperature adjuster configured to control a temperature of the etalon; and a controller configured to stabilize output of the harmonic light, wherein, based on detection results from a light detector detecting the wavelength and optical intensity of the harmonic light emitted from the resonator housing, the controller controls the first temperature adjuster and the second temperature adjuster such that the detected wavelength of the harmonic light approaches the predetermined wavelength, and such that the detected optical intensity of the harmonic light is at least a predetermined value corresponding to the maximum output signal output from the light detector, and the controller further outputs a control signal to each of the first temperature adjuster and the second temperature adjuster to perform temperature adjustment in an order of adjusting the temperatures of the laser medium and the nonlinear optical crystal, then the temperature of the etalon, such that the second temperature adjuster adjusts the temperature of the etalon while maintaining the adjusted temperatures of the laser medium and the nonlinear optical crystal.

14. The laser source device according to claim 13, further comprising a third temperature adjuster controlling a temperature of the resonator housing, wherein the controller controls the third temperature adjuster and maintains the temperature of the resonator housing at a predefined reference temperature.

15. The laser source device according to claim 14, wherein:

the resonator housing further comprises supports configured to support each of the laser medium, the nonlinear optical crystal, and the etalon, and the resonator housing and each of the supports are constructed of a material having thermal conductivity of at least 170 W/mK.

16. The laser source device according to claim 15, wherein the resonator housing and each of the supports are constructed of beryllium copper.

17. The laser source device according to claim 14, wherein the resonator housing and each of the supports are constructed of beryllium copper.

18. The laser source device according to claim 13, wherein:

the resonator housing further comprises supports configured to support each of the laser medium, the nonlinear optical crystal, and the etalon, and the resonator housing and each of the supports are constructed of a material having thermal conductivity of at least 170 W/mK.

19. The laser source device according to claim 18, wherein the resonator housing and each of the supports are constructed of beryllium copper.

* * * * *